United States Patent [19]

Lipman

[11] Patent Number: 4,922,401
[45] Date of Patent: May 1, 1990

[54] INVERTER CIRCUIT UTILIZING THE REVERSE VOLTAGE CAPABILITIES OF SYMMETRICAL GATE TURN OFF THYRISTORS

[75] Inventor: Kenneth Lipman, West Hartford, Conn.

[73] Assignee: International Fuel Cells, South Windsor, Conn.

[21] Appl. No.: 355,488

[22] Filed: May 22, 1989

[51] Int. Cl.$^5$ .............................................. H02H 7/122
[52] U.S. Cl. .................................... 363/58; 363/138; 363/96
[58] Field of Search ................... 363/57, 58, 135, 136, 363/137, 138, 27, 28, 96

[56] References Cited

U.S. PATENT DOCUMENTS

| | | |
|---|---|---|
| 3,349,315 | 10/1967 | Studtmann ........................... 363/137 |
| 3,818,311 | 6/1974 | Mattson et al. . |
| 4,204,264 | 5/1980 | Lipman . |
| 4,336,587 | 6/1982 | Boettcher et al. . |
| 4,365,171 | 12/1982 | Archer . |
| 4,403,269 | 9/1983 | Carroll . |
| 4,432,032 | 2/1984 | Baker et al. . |
| 4,549,258 | 10/1985 | Honbu et al. . |
| 4,611,267 | 9/1986 | McMurray . |
| 4,685,039 | 8/1987 | Inou et al. . |
| 4,710,862 | 12/1987 | Asaeda ................................. 363/58 |

FOREIGN PATENT DOCUMENTS 158467 4/1983 Japan ..................................... 363/58

OTHER PUBLICATIONS

"Galvanically Isolated Switching Supplies Provide High Power", by Jim Williams, EDN Nov. 26, 1987.
"Regulator IC Speeds Design of Switching Power Supplies", by Jim Williams, EDN Nov. 12, 1987.
"Computer-Aided Design of Power Transistor Inverter Snubber Circuits", by Pong et al., IEE Proceedings, vol. 134, Pt. B, No. 2, Mar. 1987.
"Simplified High-Power Solid-State Inverter", Electronic Eng., Jun. 1986.

Primary Examiner—Peter S. Wong
Attorney, Agent, or Firm—McCormick, Pauldings & Huber

[57] ABSTRACT

A novel inverter circuit having symmetrical gate turn-off thyristors (GTO) includes reactive circuit elements for recovering stored energy. The circuit is characterized by a center tapped transformer configured without tightly coupled anti-parallel diodes, thereby allowing for the presentation of reverse voltages to each GTO.

11 Claims, 1 Drawing Sheet

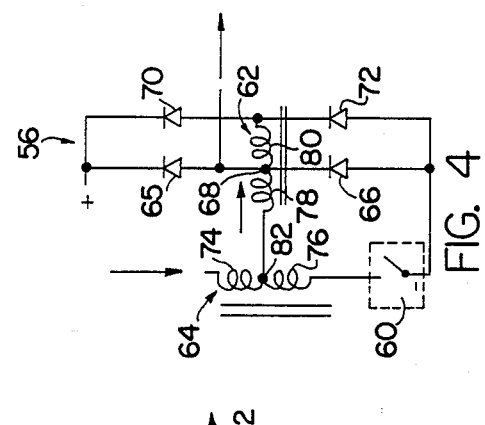
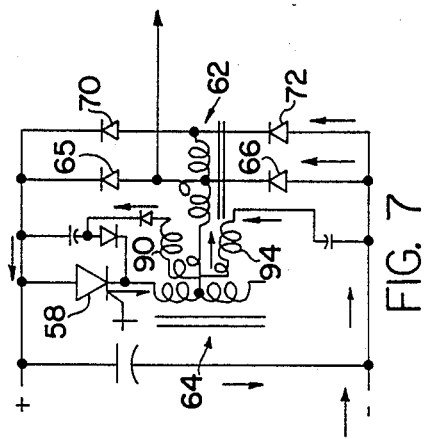
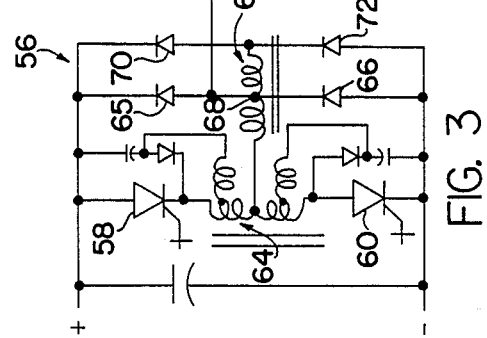
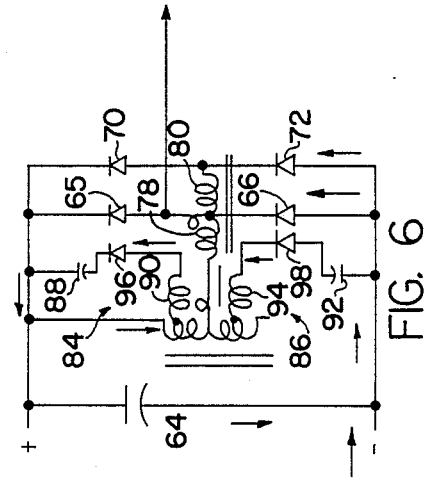
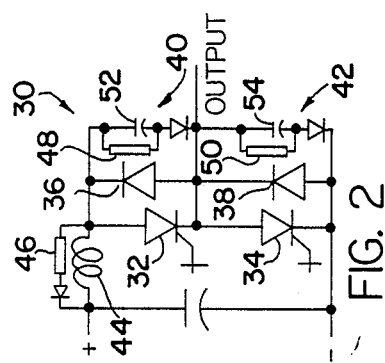
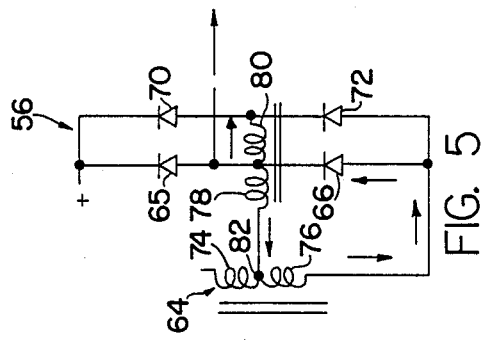
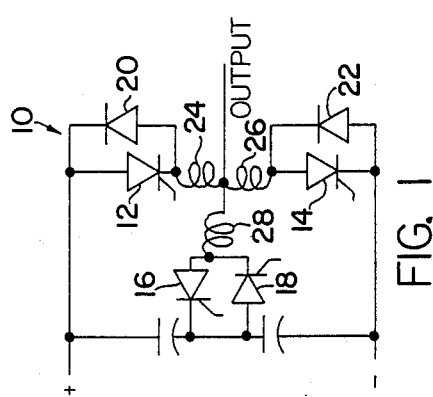

INVERTER CIRCUIT UTILIZING THE REVERSE VOLTAGE CAPABILITIES OF SYMMETRICAL GATE TURN OFF THYRISTORS

TECHNICAL FIELD

The present invention relates in general to snubber circuits and more particularly to snubber circuits which return energy to the power supply by means of a transformer.

BACKGROUND OF THE INVENTION

The silicon controlled rectifier, or thyristor, has been the major device used in power applications for almost three decades. Its internal current latching characteristic that allows for the handling of heavy overloads without destruction has resulted the use of thyristors at energy ratings far higher than any competitive semiconductor device.

Thyristors need to be turned off by an external means such as a device that reverses load current or device terminal voltage. For inverter applications, an impulse signal controlled by an auxiliary device is the most common means to turn off a thyristor. In spite of the complication requiring auxiliary commutation circuits, thyristor inverters have dominated the high power applications until the last five years.

The Gate Turn-Off Thyristor or GTO is the preferred device for inverters and converters for power rating above 500 KW. Since it can be controlled with a low energy gate pulse signal, the commutation means used with conventional thyristors, a GTO inverter pole circuit in its simplest form contains only two GTOs and two anti-parallel diodes and snubber circuits (snubbers) to control voltage and current. The GTO is now being applied almost universally as it does not need the high energy pulse turnoff circuit. Instead, the turnoff pulse signal is applied to gate off the GTO. GTO's are available in power ratings comparable to thyristors and, manufacturers are working on even higher power GTO's.

As with any device, there are limitations imposed by current and voltage changes on GTO's that require the use of snubber circuits. These circuits are one of the principle sources of parasitic losses which limit inverter pole circuit efficiency. In applying GTO's to applications previously handled by thristors, little has usually been done except remove the commutating circuits and increase the size of the snubber circuit elements. The losses of the commutation circuits has been replaced by those in the snubber and gate circuits. There have been some circuits published for reducing snubber losses, but they use added GTO's and require high voltage elements.

For example, a high powered GTO pole circuit in the multi-kilovolt range has snubber circuit elements that dissipate 1% to 2% of the full power output. Thus, a pole circuit using a typical GTO snubber circuit would dissipate 10 to 20 KW for a one MW output. Losses of 1% to 2% are for GTO pole circuits running at most at 180 Hz. Pulse width modulation cannot be used as a means to reduce harmonics with a simple GTO pole circuit design without very high losses.

In high power circuits, the problem of removing the heat due to the snubber circuit losses dictates the cooling system and construction specifications. Since the size of the capacitors and inductors associated with the snubber circuitry depend on the GTO parameter limitations, only energy recovery is available as a means for significant loss reduction. The energy must either be transferred to the load or back to the power supply on the DC bus.

SUMMARY OF THE INVENTION

An object of the present invention is to provide an inverter pole circuit that returns stored energy from a snubber circuit to a power supply with a minimum of electrical elements, Another object of the present invention is to provide an inverter pole circuit employing a gate turnoff thyristor (GTO) capable of returning energy from a snubber circuit to a DC power bus wherein the GTO is subject to a reverse voltage.

Another object of the present invention is to provide an inverter pole circuit employing a gate turnoff thyristor (GTO) capable of returning energy from a snubber circuit to a DC power bus without a diode element configured directly across the GTO.

According to the present invention, in a direct current power converter, a power conversion circuit section for extinguishing (snubbing) without power loss signal transients in a received power supply electrical signal having an associated current and voltage magnitude, the power conversion circuit section includes first and second series coupled symmetrical switching devices receiving power supply electrical signal, with the devices configured to only receive from the power supply signals of a selected polarity. The circuit section also comprises a first reactive element having a signal tap which is serially configured between said devices as well as shunt capacitive and inductive elements associated therewith. A second, regenerative reactive element has a first electrode configured with the first reactive element tap and has a first and second sections serially connected at a junction, with a first diode and a second diode antii-parallel therewith configured at the junction. The second reactive element further has a first regenerative diode and a second regenerative diode anti-parallel therewith configured with a second electrode thereof. The second reactive element and associated diodes are electrically configured to allow reverse polarity signal voltages of a selected magnitude to be presented to the devices, thereby enabling energy associated with the extinguished (snubbed) signal energy stored in the circuit section to be provided back to the power supply.

BRIEF DESCRIPTION OF THE DRAWING

FIG. 1 is a simplified schematic illustration of a known thyristor circuit.

FIG. 2 is a simplified illustration of a known inverter pole circuit having resistors for dissipating stored energy.

FIG. 3 is a simplified schematic illustration of an inverter pole circuit provided according to the present invention.

FIGS. 4 and 5 are simplified schematic illustrations of a portion of the circuit of FIG. 3 illustrating the effect on circuit performance of GTO switching.

FIGS. 6 and 7 are simplified schematic illustrations of a portion of the circuit of FIG. 3 illustrating the effect on circuit performance of snubber circuitry.

DETAILED DESCRIPTION OF THE PREFERRED EMBODIMENT

The circuit of the present invention and its advantages can be understood in comparison to an ideal switch as well as to thyristor and GTO inverter circuits. An AC output signal can be generated from a DC signal by closing either one of two ideal, lossless switches configured across a DC power supply to carry current in either direction. The means to approximate an ideal switch is a switching semiconductor such as a transistor or a thyristor. For megawatt scale circuits, this is usually some type of thyristor.

In FIG. 1, there is shown in schematic form a thyristor forced commutated split "C" inverter pole circuit 10 that uses components such as thyristors 12, 14, 16 and 18, as well as diodes 20 and 22 that require control, dissipate power (inductors 24, 26, and 28) and account for a significant part of the total inverter volume and power switch cost. Necessary snubber resistor-capacitor networks (not shown) across the devices limit rates of voltage rise and maximum overshoot without dissipating a significant amount of power for frequencies up to 600 Hz.

The chief reason that commutation circuits are large is that they must produce pulses of 140% to 160% of the inverter peak output current rating. A GTO on the other hand utilizes a low voltage pulse of less than 1% of device rating and require peak currents of less than 25% in the worst case load current. Thus an inverter using GTO's is potentially much smaller and less expensive than an auxiliary commutated thyristor design.

A circuit 30 shown in FIG. 2 is sufficient to build a working inverter pole. The circuit 30 includes GTOs 32 and 34 configured with diodes 36 and 38. Snubber circuits 40 and 42 limit turn off losses and prevent device damage. A series inductance 44 limits the rate of current rise (di/dt) in the device. Diodes 36 and 38 are configured anti-parallel with their respective GTO to prevent reverse voltages from appearing thereacross. However, note resistors 46, 48 and 50 associated with the inductor 44 and capacitors 52 and 54, respectively. Each time a switching action occurs, stored energy is removed by dissipation through one or more of the resistors. By limiting circuit operating frequencies, it is possible to build inverters with efficiencies greater than 95%. However, even at 180 Hz, the minimum frequency for controlling voltage of a three phase bridge, the size of the damping resistor banks and their losses are as great as the commutation circuits of the thyristor designs.

The means for reducing the losses incurred in removing energy from capacitors is to use some form of resonant charging with an inductor. The means for removing energy from an inductor is to allow the voltage across it to reverse. If the magnitude of the reverse voltage is accomplished using diodes connected to the DC bus, the energy in the inductor can be returned to the power source with very low losses. The circuit in FIG. 2 could incorporate energy recovery by adding an extra winding to the inductor 44. However, an analysis of this approach shows a major limitation; the clamping diodes 36 and 38 need voltage ratings of 5 to 10 times the maximum supply voltage. The voltage magnitude could be 30 KV for a 3000 volt DC bus.

Referring now to FIG. 3, there is shown in simplified schematic form an inverter pole circuit 56 provided according to the present invention. The circuit 56 is characterized by regenerative capacitor discharge and regeneration of energy in a series (di/dt) inductor back to the DC bus using an autotransformer. The circuit 56 includes symmetrical GTO's 58 and 60 to allow a controlled-limited reversing voltage during regeneration. A regeneration transformer 62 is added to return the stored energy to the DC bus. The single ended (di/dt) reactor 44 of FIG. 2 is replaced by a tapped transformer 64 between the GTO's. Anti-parallel diodes 65, 66 are configured with tap 68 on the regeneration transformer in contrast with known circuits where feedback diodes are connected directly across each GTO. Reverse voltages can now appear across each GTO. The circuit 56 also includes regeneration diodes 70, 72. Snubber circuits for limiting voltage transients configured with the GTO's only shown for purposes of illustrative clarity.

To detail operation of the circuit 56, it is assumed that current has been flowing through the GTO 58 as shown by the arrows in FIG. 4. The transformer 64 which limits the rate of current change (di/dt) is comprised of first and second sections 74 and 76 and is assumed not to saturate. The energy (E) in transformer 64 is given by $E=0.5*L_{74}*I^2$, where $L_{74}$ is the inductance of the first section 74 of transformer 64 and I is the magnitude of the current flowing therethrough. The regeneration transformer 62 comprises first and second sections 78 and 80 having corresponding inductances $L_{78}$ and $L_{80}$. Transformer 62 has no deliberate gap, and it saturates in the direction of current flow into transformer section 78. When the GTO 58 is switched off, current must continue to flow through each transformer because of the stored energy in their associated magnetic fields. The voltage through the di/dt reactor 64 reverses to a value limited by the circuit. Closing the GTO 60 (indicated schematically) yields the current paths shown in FIG. 5.

If the magnitudes of $L_{74}$ and $L_{76}$ are equal, the current flow into tap 82 on the di/dt reactor 64 is the reverse of the load current, and the current through section 80 is equal to the ratio of the square of the turns that comprise sections 78 and 80 plus a small amount due to the energy stored in the magnetic field of the regeneration transformer before the saturation point on the core was reached. Further, with tightly coupled inductors, i.e. those whose coefficient of coupling approaches 1, the voltage at the centertap 82 of the di/dt transformer will equal the voltage on the DC bus $V_{DC}*(L_{78}/L_{80})$. Notice also that antiparallel diode 62 has picked up full load current, that is the current flowing back into the di/dt transformer and the regeneration transformer exciting current.

The current through the di/dt transformer will subsequently drop in magnitude at a rate equal to $V_{DC}*(N_{78}/N_{80})L_{78}$, where $N_{78}/N_{80}$ corresponds to the turns ratio between transformer sections 78 and 80. There will be comparable drop in the exciting current through the regeneration transformer due to its exciting current also, but the main current flow is a function of the energy stored in the di/dt transformer. The direction of current flow from transformer section 80 into the DC bus represents energy being returned to the power source as opposed to being dissipated as in the circuit of FIG. 2.

As detailed above, the stored energy from the di/dt transformer can be removed by returning it the supply rather than by being dissipated in resistors. Note that a negative voltage of limited value, depending on the turns ratio of the regeneration transformer sections and the DC supply voltage appears across a winding of the di/dt transformer. The voltage stress across the GTO which turns off is equal to the supply voltage plus the total voltage across the di/dt transformer. This total voltage is equal to twice the voltage at the center tap 82 if $N_{78}/N_{80}$ equals 1. Therefore, the stress voltage is equal to 1.2 times the DC supply voltage.

In practice, perfect coupling between windings of a transformer or inductor is not possible. It is also true that the circuit performance detailed above did not include the effects of capacitors and elements associated with snubber circuitry. FIG. 6 is a simplified schematic illustration of a portion of the circuit of FIG. 3 illustrating the effect on circuit performance of snubber circuitry. In addition to the elements shown in FIGS. 3-5, snubber circuits 84 and 86 respectively comprised of capacitor 88, inductor 90, capacitor 92 and inductor 94 are also shown in FIG. 6.

When the upper GTO is turned on while the load current is flowing (as shown by the arrows), voltage is developed across the upper half of the di/dt transformer equal to the supply voltage. By transformer action, about the same voltage appears across the lower half thereof. Only a small voltage appears across the regeneration transformer due to diode voltage drop differences of diodes 66 and 72. Voltages do not change instantly in capacitors. As a result, defined voltages appear across inductors 90 and 94. These reactors (inductors) are connected to 50% taps on each half of the di/dt transformer 64. Therefore, the voltage across the inductors 90 and 94 is equal to 50% of the supply voltage.

Each inductor and the capacitor in series comprise a resonant circuit. As long as the load current flows through the diode, maintaining bus voltage across half of the di/dt inductor, the resonant circuits will go through a half-cycle pulse period which would leave the voltage across the capacitors changed by twice one-half the bus voltage. Further change is stopped by the diodes 96, 98 arranged in series with the inductors 90, 94. If the resonant pulse period is sufficiently short, the capacitor associated with the GTO that is turning on is discharged, and the snubber capacitor of the GTO in anti-parallel with the current carrying diode is charged to the reverse value of the supply bus.

However, with the bus voltage across half of the di/dt transformer, current therethrough increases which decreases current through diode 66. The ampere turns through the regeneration transformer remains low with current flow through diode 66 and the winding to which it is connected thereby balancing the ampere turns between the di/dt transformer (reactor) and the output section of the regeneration transformer.

When the current through diode 66 goes to zero, the voltage across the transformer 64 changes in the direction necessary to maintain current flow (Lenz's Law). Neglecting the effects of the capacitances in the circuit, the voltage will increase until diode 65 is positively biased; and starts to conduct. The voltage across the regenerative transformer section 80 with $N_{80}$ turns is equal to the supply voltage. The voltage, $V_{78}$, across the other transformer section 78 is $V_{78} = V_{DC} * N_{78}/N_{80}$. The center-tap 82 voltage of the di/dt transformer is raised above the supply voltage by the voltage across section 78. By transformer action the total voltage, $V_{64}$, across the transformer then is then $V_{64} = 2*N_{78}*V_{DC}/N_{80}$. GTO 60 sees this voltage plus the supply voltage.

A small voltage is also present across the regeneration transformer. The current flowing through section 78 is balanced by a current of magnitude $N_{78}/N_{80}$ from section 80. With voltage across the regeneration transformer as described above, the excitation current and the magnetic flux build up therein. At the time that the current flowing through the diode 65 approaches zero, the resonant capacitance portions of the snubber circuits have stored energy whose magnitude is dependent on the time required for diode turn-off.

It is possible to simulate circuit conditions using an algorithm such as that one embodied by the "Hspice" computer program to verify that the snubber capacitors are discharged before the GTO is turned off, and, most importantly, that the discharge is through the inductors. In addition, much of the stored energy in the inductors is returned through the regeneration transformer to the DC bus.

In most cases, the time for an anti-parallel diode to stop conducting is less than the time for the snubber capacitor to discharge. When the snubber capacitor 96, across the GTO 58 discharges, there is still current flowing through inductor 90. The rate of current decrease depends on the voltage drop across the diodes, series resistance and the induced voltage from the di/dt transformer.

FIG. 7 is a simplified illustration of the circuit of FIG. 3 showing current flow therethrough when a GTO is conducting. An examination of FIG. 7 reveals that if the polarity of the di/dt transformer secondary is the same as the primary, and the voltage across the di/dt transformer is negative, the current through inductor 90 may actually increase. Thus, a circuit designer may actually choose to reverse the polarity of the transformer coupling to cause the energy from inductor 90 to return to the power supply via the DC bus. With the reversal of the voltage on inductor 90, energy can be available to provide power to the GTO gate drive by means of a secondary winding on inductor 90.

To summarize, snubber capacitor and inductor energy recovery;

Energy stored in the di/dt reactors is regenerated back into the DC bus.

The inductors in snubber discharging circuit assure that the capacitors are discharged in the minimum time.

Some of the snubber inductor energy can be recovered through the regeneration transformer or to the gate or logic power supply.

The regeneration circuits do not require diodes with ratings more than 50% greater than the other components nor active devices.

I claim:

1. A method of restoring energy associated with transient signal compensation in a portion of a power conversion circuit to a power supply providing a power supply signal having a voltage magnitude following commutation of said circuit portion, said circuit portion including first and second switching devices configured to receive and transmit signals of a selected polarity, said devices coupled in series with a first reactive element therebetween and associated shunt capacitive and reactive elements, said first reactive element divided by a tap into first and second portions each configured with an associated one of said shunt reactive elements, said first reactive element for providing signals at said tap to a first electrode of a second, regenerative reactive element having first and second sections serially connected at a junction, with a first diode and a second diode anti-parallel therewith configured at said junction and further having a first regenerative diode and a second regenerative diode anti-parallel therewith configured with a second electrode of said second regenerative reactive element, said method comprising the steps of:

generating energy from said signal commutation;

storing energy in said capacitive and first reactive elements; and transferring said stored energy to said power supply including the step of providing signals of a reverse polarity to said first and second switching devices by generating across said first and second shunt reactive elements signals having a voltage reduced in magnitude from said power supply signal voltage magnitude.

2. In a direct current power converter, a power conversion circuit section for extinguishing (snubbing) without power loss signal transients in a received power supply electrical signal having an associated current and voltage magnitude, said circuit section comprising:

first and second series coupled symmetrical switching devices receiving said signal, said devices configured to only receive from said power supply signals of a selected polarity;

a first reactive element having a signal tap dividing said first reactive element into two portions, said element serially configured between said devices;

shunt first and second snubber circuits associated with said first and second switching devices, each snubber circuit having a capacitor, diode and inductive element respectively configured with said first reactive element portions for generating across said snubber circuit inductive elements signals whose voltage magnitude is of a reduced magnitude as compared to the power supply electrical signal magnitude; and a second, regenerative reactive element having a first electrode configured with said first reactive element tap and having first and second sections serially connected at a junction, with a first diode and a second diode anti-parallel therewith configured at said junction and further having a first regenerative diode and a second regenerative diode anti-parallel therewith configured with a second electrode of said second regenerative reactive element, said second reactive element and said diodes electrically configured to allow reverse polarity signal voltages of a selected magnitude on said devices, thereby enabling energy associated with said extinguished (snubbed) signals stored in said circuit section to be provided back to said power supply.

3. The circuit section of claim 2 wherein said devices comprise gate turnoff thyristors (GTO).

4. The circuit section of claim 2 wherein said tap divides said first reactive element into two sections of equal inductance.

5. The circuit section of claim 2 wherein said second regenative reactive element comprises a regeneration transformer.

6. The circuit section of claim 2 wherein said first reactive element comprises an autotransformer.

7. The circuit section of claim 5 wherein said reverse signal voltage magnitude is dependent on the turns ratio of said regeneration transformer and the DC voltage of said supply signal.

8. The circuit section of claim 3 wherein said reverse signal voltage has a magnitude approximately equal to said supply signal voltage plus the total voltage across said first reactive element.

9. The circuit section of claim 2 wherein said first and second snubber circuit reactive elements are configured to have a signal thereacross of a voltage magnitude of approximately one half of said power supply signal voltage magnitude.

10. The circuit section of claim 2 wherein said signal voltage across said first and second snubber circuit reactive elements reverses in polarity and is provided to a gate drive member of an associated one of said first and second series coupled symmetrical switching devices, thereby providing energy to switch the electrical state thereof.

11. The circuit section of claim 2 wherein said snubber circuit diodes have a voltage rating approximately equal to said power supply electrical signal voltage magnitude.

* * * * *

UNITED STATES PATENT AND TRADEMARK OFFICE
CERTIFICATE OF CORRECTION

PATENT NO. : 4,922,401
DATED : May 1, 1990
INVENTOR(S) : Kenneth Lipman

It is certified that error appears in the above-identified patent and that said Letters Patent is hereby corrected as shown below:

Col. 2, Line 41, "antii-parallel" should be --anti-parallel--.

Col. 4, line 55, after "will be" please insert --a--.

Signed and Sealed this

Tenth Day of September, 1991

Attest:

*Attesting Officer*

HARRY F. MANBECK, JR.

*Commissioner of Patents and Trademarks*